United States Patent [19]

Denny et al.

[11] 4,227,660
[45] Oct. 14, 1980

[54] METHOD AND APPARATUS FOR EXTENDING CONVEYOR BELTS

[75] Inventors: John L. Denny, Beckley, W. Va.; Robert H. Alley, Bluefield, Va.

[73] Assignee: Advance Mining Products, Inc., Falls Mills, Va.

[21] Appl. No.: 43,640

[22] Filed: May 30, 1979

Related U.S. Application Data

[62] Division of Ser. No. 934,598, Aug. 17, 1978.

[51] Int. Cl.² ............................................. B65H 17/46
[52] U.S. Cl. ................................. 242/86.52; 198/812
[58] Field of Search ............ 242/86.52, 86.51, 86.5 R, 242/58.6, 67, 55, 54 R; 198/750, 812, 866

[56] References Cited

U.S. PATENT DOCUMENTS

| | | | |
|---|---|---|---|
| 2,846,051 | 8/1958 | Craggs | 198/812 |
| 2,933,177 | 4/1960 | Long | 198/812 |
| 3,795,304 | 3/1974 | Poundstone | 198/750 |
| 3,796,298 | 3/1974 | Russell | 198/750 |

*Primary Examiner*—Edward J. McCarthy
*Attorney, Agent, or Firm*—Mason, Fenwick & Lawrence

[57] ABSTRACT

A carrier vehicle supports plural drums of belting material for deployment in the lengthening of conveyor belts in mines with the belting material being in a double thickness having its midpoint over a removable winding rod extending eccentric and parallel to the axis of each drum so that the belting material can be unwound from the drum after its ends are connected to the old belt. A chain extends between the vehicle and the tailpiece of an existing conveyor system so that forward movement of the vehicle unwinds the new belting and moves the tailpiece to a forward extended position simultaneously with a minimum of labor. In a second embodiment, plural rolls of new belting material are supported on a movable vehicle with the belting material being in a single ply but with adjacent rolls being reversely wound so that the belting can be deployed from the upper portion of one roll and the lower portion of an adjacent roll while the vehicle moves the tailpiece to its new location. In both embodiments, the vehicles include wire rope cable dispensing reels which also dispense cable for supporting the new conveyor belt portion at the same time that the new conveyor belt is being unrolled.

8 Claims, 13 Drawing Figures

METHOD AND APPARATUS FOR EXTENDING CONVEYOR BELTS

This is a division, of application Ser. No. 934,598 filed Aug. 17, 1978.

This invention is in the field of material handling and is more specifically directed to the field of closed loop conveyor belts of the type used for moving a wide variety of materials. Even more specifically, the present invention is directed to a unique apparatus and method for lengthening conveyor belts employed in restricted areas such as coal or other type mines having low overhead restrictions. While the preferred embodiment of the invention is described in connection with its use in a coal mine, it should be understood that the invention is capable of usage in other types of mines and is also capable of above-ground usage both outdoors and in buildings.

Conveyor belts employed in coal mines basically consist of an elongated loop of belting material extending from a headpiece roller at the discharge end of the conveyor frequently outside the mine and a tailpiece roller near the face of the seam being mined for receiving the coal removed from the face of the seam. Continued mining of the face of the seam eventually results in the face of the seam being a substantial distance from the loading end of the conveyor so that it is consequently necessary to extend the length of the conveyor toward the face so as to position the loading end more conveniently with respect to the face. Such extension of the length of the conveyor has in the past been an extremely cumbersome and laborous endeavor due largely to the lack of vertical working space. More specifically, it is the current practice to initially manually load a length of new belting material in a reefed manner on a mine vehicle from a supply reel outside the mine with the length of new belting material being such as to provide the desired lengthening of the conveyor system. The old belt loop is positioned so that a mechanical splice juncture is adjacent the tailpiece roller and the mechanical splice juncture is then disconnected to provide an upper free end and a lower free end of the old conveyor belt. The tailpiece is then moved forwardly by a tractor or the like to its new desired location and the new belting is brought to the area of the upper and lower old belt end. The lower end of the reefed belting material is connected to the lowermost old belt end and the new belting material must then be manually extended and carried to the tailpiece roller and brought around the roller to permit its other end to be spliced by a mechanical connector to the uppermost old belt end. It is also necessary to extend the conveyor belt support wire rope members and their supporting stands along each side of the new belting to permit the mounting of supporting rollers beneath both the upper and lower flights of the new belting. The foregoing procedure is very time consuming and expensive due to down time and the labor expense of a substantial number of workmen required as a result of the heaviness and cumbersome nature of the new belting material which is compounded by the space restrictions inherently found in mines.

Therefore, it is the primary object of this invention to provide a new and improved apparatus and method for effecting the lengthening of conveyor belts.

A further object of the invention is the provision of a new and improved method for extending closed loop type conveyor belts.

Yet another object of the invention is the provision of a new and improved apparatus for extending the length of closed loop type conveyor belts.

Achievement of the foregoing objects is enabled in a first embodiment through the provision of a wheeled carrier vehicle supported on either pneumatic tires or on flanged rail wheels with the vehicle including first and second transverse roll support shafts mounted on its framework for supporting a roll of new belting material on a drum mounted for rotation on the roll supporting shaft. Each drum includes a winding rod removably insertable in a position adjacent the hub of the drum eccentric to the axis of rotation thereof.

The conveyor belt lengthening operation is initiated by first positioning the carrier vehicle adjacent a large supply reel containing new belting material as received from the manufacturer which is mounted on a supporting frame for rotation about a horizontal axis. The end of the new belting material is rolled from the supply drum and passed beneath the winding rod with the free end of the new belting material then being attached to the supporting framework for the belt supply roll and the carrier vehicle is driven forwardly. Forward movement of the carrier vehicle causes the new belting material to be unreeled from the supply roll. The carrier vehicle is stopped when it is moved a distance equal the distance which it is desired to lengthen the conveyor belt in the mine. Consequently, a double thickness of new belting material extends between the winding rod on the drum on the carrier vehicle and the new belting material supply drum and its supporting frame. The new belting material is cut at the supply drum and the new belting material is then wound about the carrier drum by a hand crank or other means attached to the carrier drum. Additionally, mechanical connector members are attached to the two ends of the new belting material which are in side-by-side relationship at the outer periphery of the roll of belting material on the carrier drum.

The carrier vehicle is then driven to a position forward of and adjacent the tailpiece of the conveyor. The old conveyor belt loop drive means is activated to position a mechanical splice area of the belt loop on the tailpiece roller. The conveyor belt loop is then slackened and the mechanical splice means disconnected to provide two old belt ends adjacent the tailpiece roller. The wire rope supports provided along opposite sides of the old conveyor belt are disconnected from the tailpiece and are connected to a vertical wire rope anchor stand locked between the ceiling and floor of the mine. The ends of the new belting material on the carrier drum are unwound and connected to the upper old belting end and the lower old belting end on opposite sides of the tailpiece roller to immediately provide an elongated belt loop, a portion of which remains wound in double thickness on the carrier drum on the carrier vehicle.

Movement of the tailpiece and its associated tailpiece roller toward the face of the mine in the direction in which the conveyor is being extended is achieved by attaching a chain or other towing means to the carrier vehicle which is then driven forwardly toward the face of the mine. Forward movement of the carrier vehicle consequently achieves movement of the tailpiece along with a simultaneous unwinding and deployment of the double thickness of new belting material from the carrier drum. The winding rod is normally removed prior to the initiation of such unwinding movement and the new belting material is consequently completely unwound and clears the carrier drum as the tailpiece moves into its desired new position.

In mines in which the conveyor belt is supported by side mounted wire rope members, the carrier vehicle is provided with two supply reels of such wire rope and the ends of the wire rope on these reels is connected to the anchor jack stand prior to the initiation of movement of the tailpiece. Consequently, such movement of the tailpiece effects the unreeling of a desired amount of the wire rope which is then cut and attached to the tailpiece after the tailpiece is in its new position. Intermediate support members are provided beneath the side mounted wire rope carriers and supporting rollers attached thereto for providing support for the added length of new belting material. Upon adjustment of the tension of the belt by conventional means the conveyor belt is ready for further operation.

Thusly, the conveyor belt is lengthened by a substantial distance with practically no manual labor being required.

In a second embodiment, the carrier vehicle is provided with a plurality of new belting support drums on which a single thickness of new belting material is wound. The carrier vehicle of the second embodiment is of greater height than the carrier vehicle of the first embodiment; however, the carrier vehicle of the second embodiment has the capacity for carrying a substantially greater quantity of new belting material.

By winding the new belting material on the two carrier rolls in reverse manner, it is possible to connect the free end from each of the webs of belting material to the first and second old belt free ends. The second carrier vehicle is attached to the tailpiece in the manner of the first embodiment and the tailpiece is moved forward by the second carrier vehicle to also consequently result in the simultaneous unwinding of the new belting material from the two carrier reels. Upon reaching the new tailpiece position, the new belting material is cut and a mechanical connector attached to each of the ends of the new belting material which have been unwound from the carrier reels and these mechanical connectors are than connected to effect closure of the loop of belting material including the old belting material and the newly added belting material. The ends are connected so that the closed loop extends about the tailpiece roller. The side wire rope support members are positioned along with their support stands in the same manner as in the first embodiment and upon adjustment of the tension of the conveyor belt, the system is again ready for operation.

A more full and complete understanding of the structure and operation of the inventive embodiments will be achieved when the following detailed description is considered in conjunction with the appended drawings.

DESCRIPTION OF THE DRAWINGS

FIG. 1-A is a side elevation view illustrating an initial step preparatory to the rolling a double thickness of new belting material onto a carrier drum of the first embodiment carrier vehicle;

Figure 1:
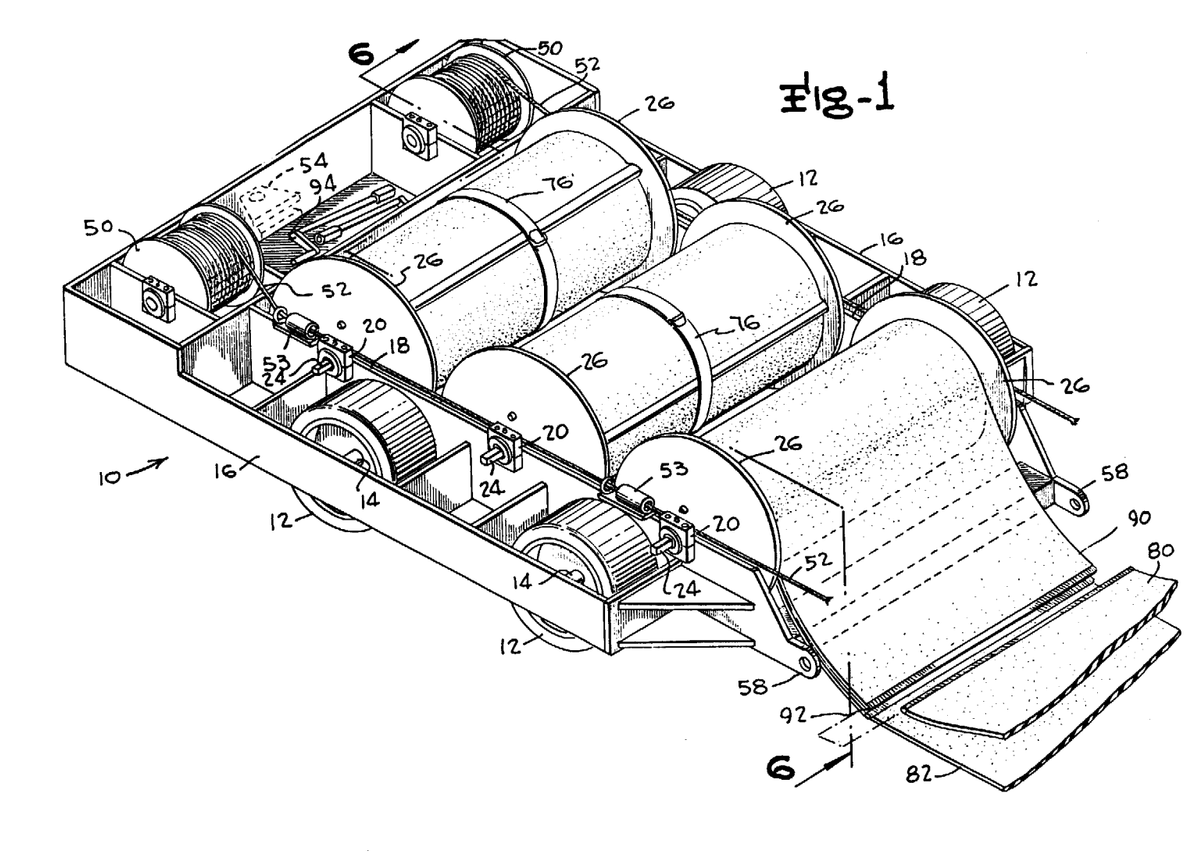
FIG. 1 is a perspective view of the first carrier vehicle embodiment.
Figure 7:
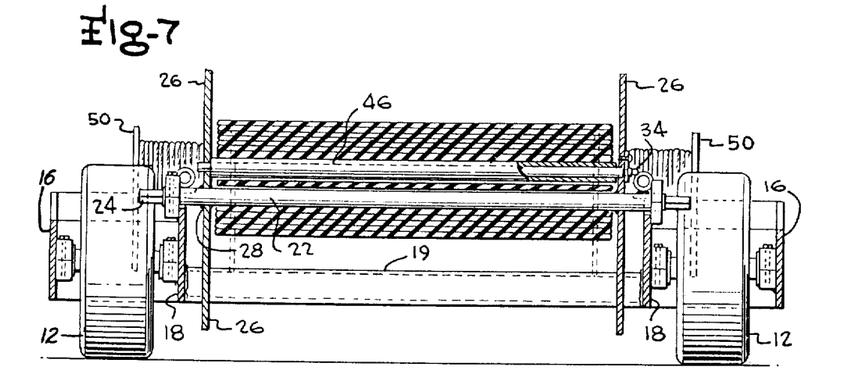
FIG. 7 is a sectional view taken along lines 7—7 of FIG. 6.
Figures 8, 9:
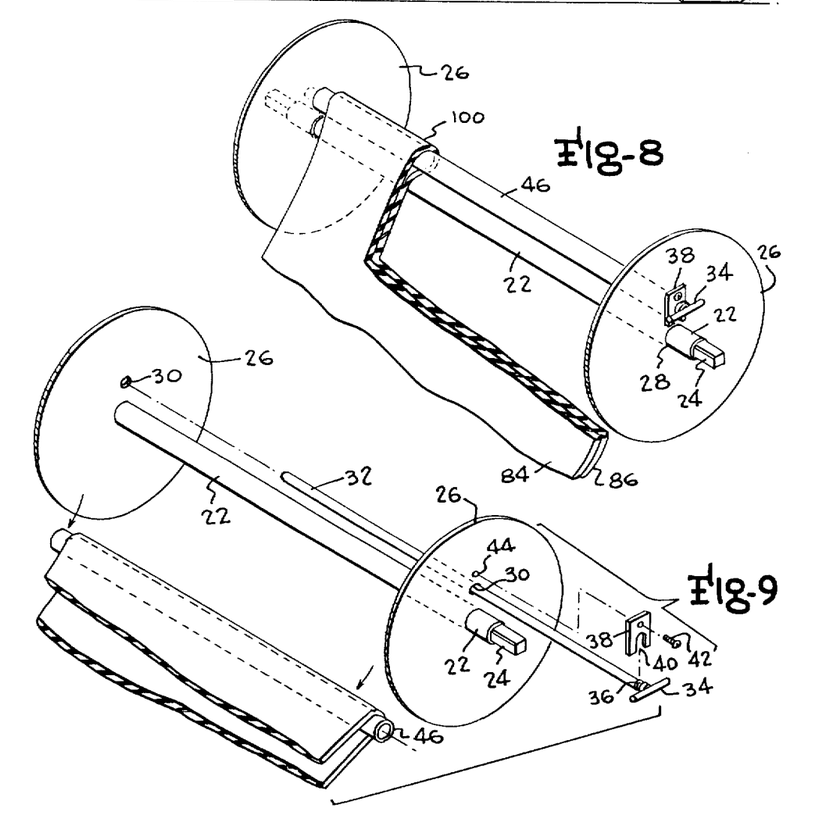
FIG. 8 is a perspective view illustrating an initial step in the winding of the new belting material on a carrier drum.
FIG. 9 is an exploded perspective view of the carrier drum of the first embodiment.

FIG. 1 illustrates a first carrier vehicle generally designated 10 employed in practice of the inventive method in a first preferred manner with the vehicle including a plurality of wheels 12 supported on axles 14 positioned between longitudinal frame members 16 and 17 extending along opposite sides of the vehicle and joined by transverse frame elements 19. Additionally, the frame members 18 provide support for a plurality of bearings 20 through which rotary drum shafts 22 of carrier drum 25 extend. Each shaft 22 has a square end portion 24 and is provided with end flange members 26 fixedly connected to the drum shaft such as by welding 28 as best shown in FIG. 7. First and second aligned openings 30 are provided eccentrically with respect to the axis of shaft 22 in each of the end flange members 26 with the openings 30 being of such size as to permit the passage of a winding rod 32 having a handle 34 on one end as shown in FIG. 9. Winding rod 32 is of sufficient length to extend through both of the openings 30 with the end of the rod being provided with an annular recess 36 adjacent handle 34 for receiving a bifurcated lock plate 38 having a center slot 40 dimensioned to be received in annular groove 36 to prevent axial movement of the rod 32 when the rod is in its mounted position illustrated in FIGS. 7 and 8. The bifurcated lock plate 38 is held in position by a threaded bolt 42 received in a threaded opening 44 in the flange 26 adjacent the handle 34 as shown in FIG. 9. Additionally, a winding sleeve 46 is fitted over the portion of winding rod 32 between the inner faces of the two flanges 26 to provide a larger diameter surface over which belting material is bent as discussed hereinafter.

Carrier vehicle 10 also includes first and second wire rope spools 50 on which wire rope 52 of the type used for supporting a conveyor belt is provided for deployment through guides as shown in FIG. 1. A hitch 54 on the front end of the vehicle is connectable to a tractor or other towing vehicle 56 for permitting movement of the carrier vehicle 10 in an obvious manner with a rear hitch 58 being provided on the rear of the vehicle 10.

Figure 3:
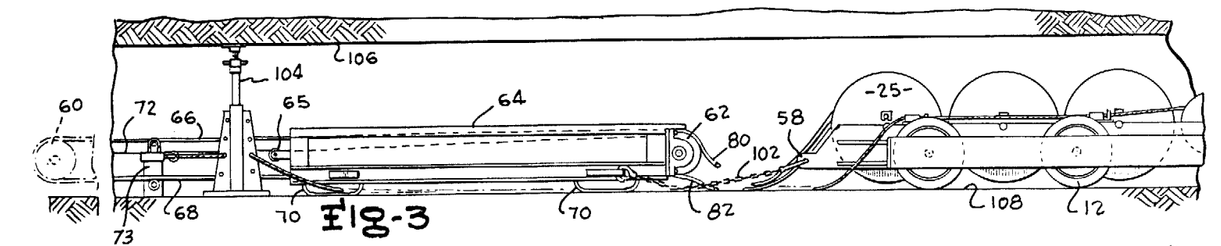
FIG. 3 is a side elevational view of a subsequent step in the inventive method.

The movable carrier vehicle 10 is employed with a conveyor belt of the type illustrated in FIG. 3 comprising a closed loop of conveyor belting material extending over a headpiece roller 60 normally positioned outside the mine in which the conveyor is employed and a tailpiece roller 62 on a tailpiece assembly 64 with the conveyor belt comprising an upper flight 66 and a lower flight 68 in a well-known manner. Tailpiece 64 provides the upstream or loading end of the conveyor whereas the headpiece roller 60 is provided at the discharge end of the conveyor. Normally, the tailpiece 64 will be mounted on sled members 70 and the tailpiece can consequently be moved by towing. The tailpiece can be also anchored in position when required.

The conveyor flights 66 and 68 are supported by side cables 72 respectively provided along each edge of the conveyor and which include means supporting an upper group of rollers engaging the lower surface of upper flight 66 and a second group of rollers engaging the lower flight 68. The foregoing conveyor system can be any of the many well-known conventional types such as, for example, the system sold by Continental Conveyor Company of Winfield, Alabama, in which intermediate cable support stands are provided for supporting the side cable 72 at discrete intervals along the length of the conveyor with the intervals being determined by the load to be carried by the particular conveyor.

When it is desired to lengthen the conveyor by extending it to the right toward the face of the seam being mined as shown in FIG. 3, the conveyor is stopped in a position in which the conventional mechanical splice means is adjacent tailpiece roller 62. The conventional mechanical splice means can be of a wide variety of types such as that using a series of interleaved metal loops attached to the belt ends through which loops a lock rod extends. The mechanical splice means or connector is disconnected to provide an upper old belt end 80 extending from the upper flight 66 and a lower old belt end 82 extending from the lower flight 68 of the old conveyor belt.

The carrier vehicle 10 is loaded with one or more full drums of new conveyor belting material by being positioned adjacent a supply reel 47 mounted on a fixed frame 48 with the end 92 of the belt on the supply reel being passed over the winding sleeve 46 and then attached to the supporting frame as shown in FIG. 1-A. The carrier vehicle is then moved away from the supply reel by a towing vehicle or tractor 56 a distance equal the distance it is desired to extend the forward end of the conveyor belt with such movement of the carrier vehicle effecting the unrolling of the new belting material which lies in a double trailing thickness consisting of an upper web 84 and a lower web 86.

Figure 2:
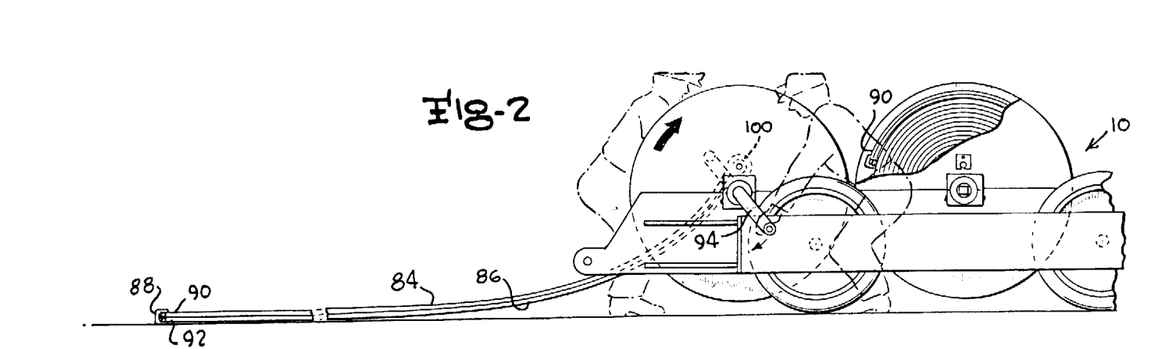
FIG. 2 illustrates a step in the method subsequent to that of FIG. 1-A.

The new conveyor belting is cut to provide an end 90 at supply reel 47 after the desired amount of belting has been unreeled from the supply reel and the two ends 90 and 92 of new belting have mechanical splice connectors applied and are fastened together by a clamp 88 holding the upper new belt end 90 and the lower new belt end 92 together as shown in FIG. 2. A crank means 94 is mounted on the square end portion 24 of the rotary drum shaft 22 and is rotated by the workman to effect the rolling of the new belting material comprising webs 84 and 86 onto the drum as exemplified by the lefthand drum in FIG. 2. Power means for rolling the belting could be used if desired. The righthand drum in FIG. 2 shows an already previously completed full reel. It will be seen that the new belting material is wound on the reel in a double thickness so that the middle portion 100 of the roll of belting material resultant from the reeling operation is at the center of the roll whereas the new belt ends 90 and 92 are provided on the outer surface of the resultant roll. Restraining belts are fastened about the belt rolls on vehicle 10 to prevent any unrolling of the belting material.

Carrier vehicle 10 is then moved into the mine to a position adjacent the old belt ends 80 and 82 as shown in FIG. 3 and a chain 102 is connected between the tailpiece 64 and to the rear hitch 58. In mines in which the conveyor is of the type employing supporting cables extending along opposite sides of the conveyor, the ends of such cables are disconnected from the fitting 65 on the tailpiece and are connected to a vertical jack stand 104 extending between the roof 106 and floor 108 of the mine. Such a jack stand is provided on both sides of the old conveyor belt and the wire rope cable 52 on each of the respective reels 50 is unwound and guided through guides 53 on the vehicle 10 with the ends of the wire rope cable being connected to the jack stands on their respective sides of the conveyor.

Figure 4:
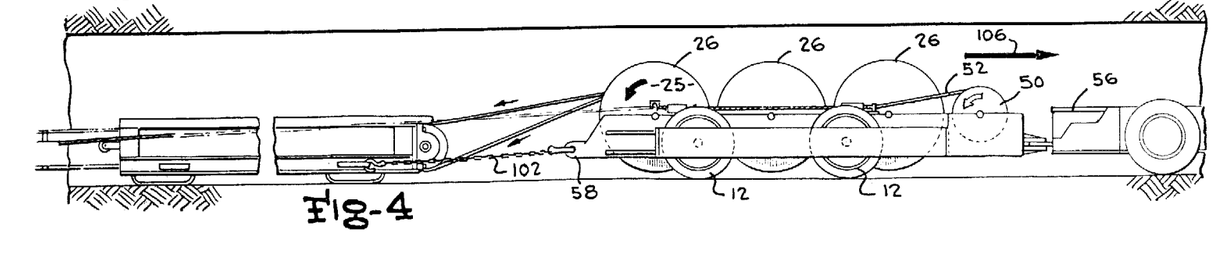
FIG. 4 illustrates a step subsequent to that of FIG. 3 in the first inventive method.
Figure 5:
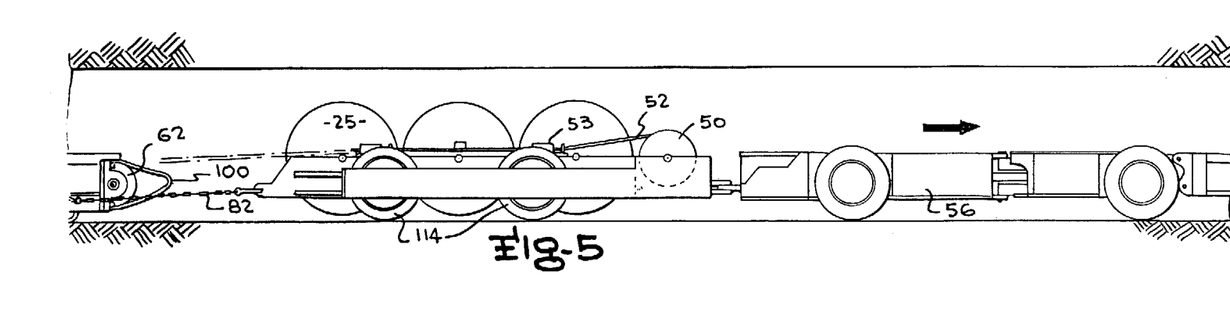
FIG. 5 is a side elevational view illustrating a subsequent step in the inventive method.
Figure 6:
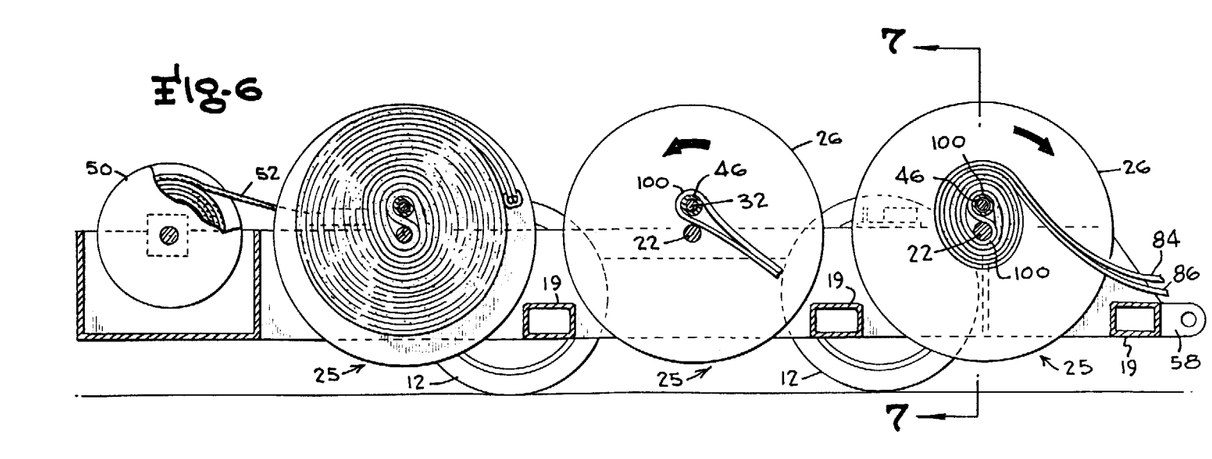
FIG. 6 is a sectional view taken along lines 6—6 of FIG. 1 illustrating three carrier rolls respectively illustrating different steps in the first inventive method.

After the carrier vehicle 10 is positioned as shown in FIG. 3, the upper old belt end 80 is connected to the upper new belt end 90 and the lower old belt end 82 is connected to the lower new belt end 92 by the conventional mechanical splice connector means. Vehicle 10 is then moved to the right in the direction indicated by arrow 106 as shown in FIG. 4 with such movement resulting in the unwinding and deployment of the double thickness of belting from the lefthand reel 25 and also resulting in the unwinding of cable 52 from the reels 50. Prior to movement of the vehicle 10 from the position illustrated in FIG. 3, the lock plate 38 is disconnected and removed to permit the winding rod 32 to be removed from within the bore of the winding sleeve 46. Consequently, when the belting material is unwound from the roll, it is disengaged from the roll and winding sleeve 46 removed so that the middle portion 100 will automatically move onto the outer periphery of the tailpiece roller 62 as shown in FIG. 5 as the tailpiece roller arrives at its new position. Consequently, it will be seen that the new belting will have been deployed automatically with a minimum of manual labor. The supporting cable 52 is then cut and attached to the fitting 65 and intermediate cable support stand elements 73 are provided at discrete intervals from the position adjacent the vertical jack stand 104 up to the new tailpiece position. Slack in the new conveyor loop consisting of the old belt portion and the new belt portion is then taken up by the actuation of conventional adjustment means. The vehicle 10 is disconnected from the tailpiece and removed from the area in front of the tailpiece and the conveyor is consequently ready to resume operation.

It should be understood that it is not necessary to obtain a new supply of new belting material for vehicle 10 until all of the reels on the vehicle 10 have been used.

Figures 1, 12:
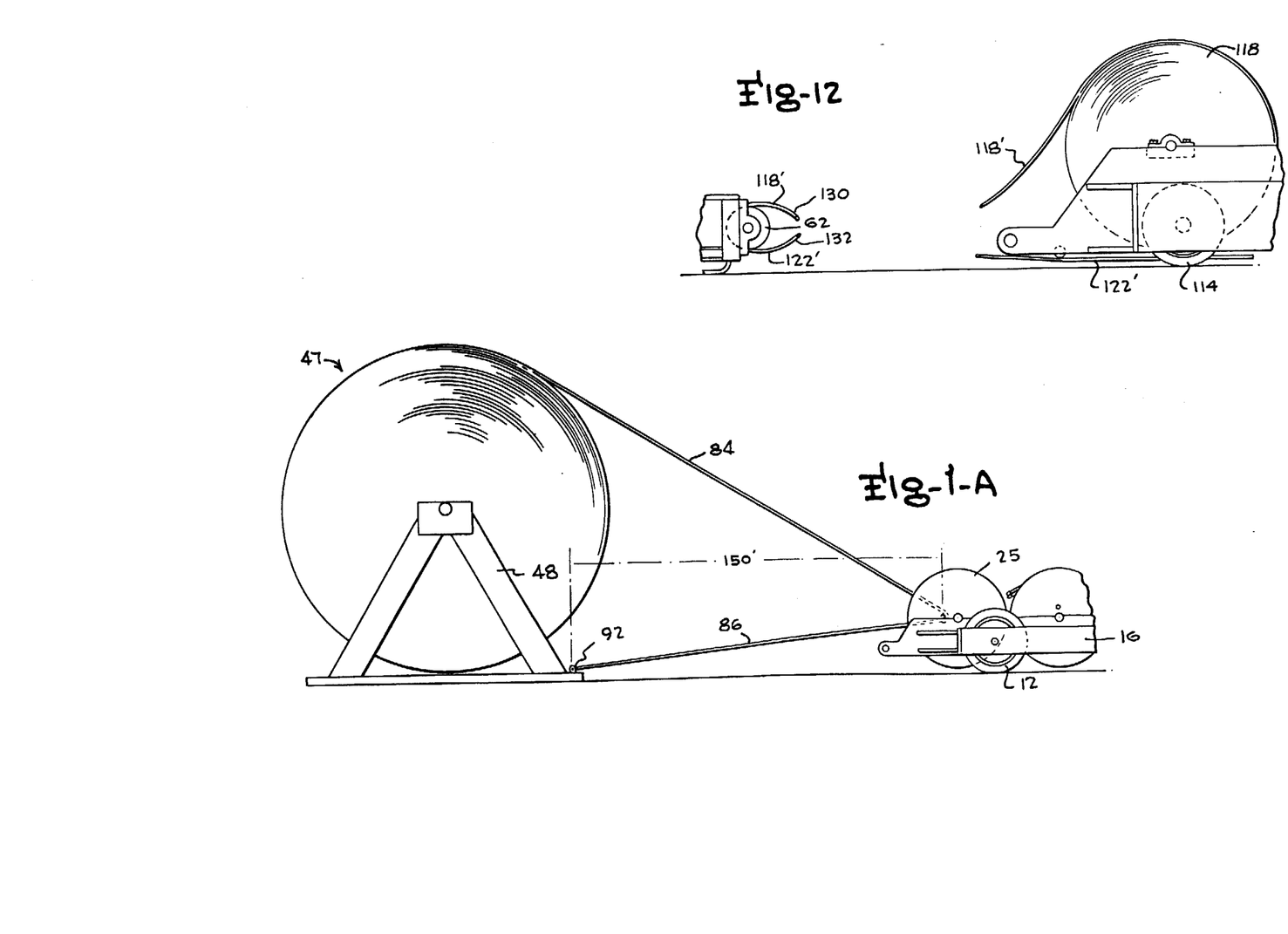
FIG. 12 illustrates a step in the second method subsequent to the step illustrated in FIG. 10.
Figure 10:
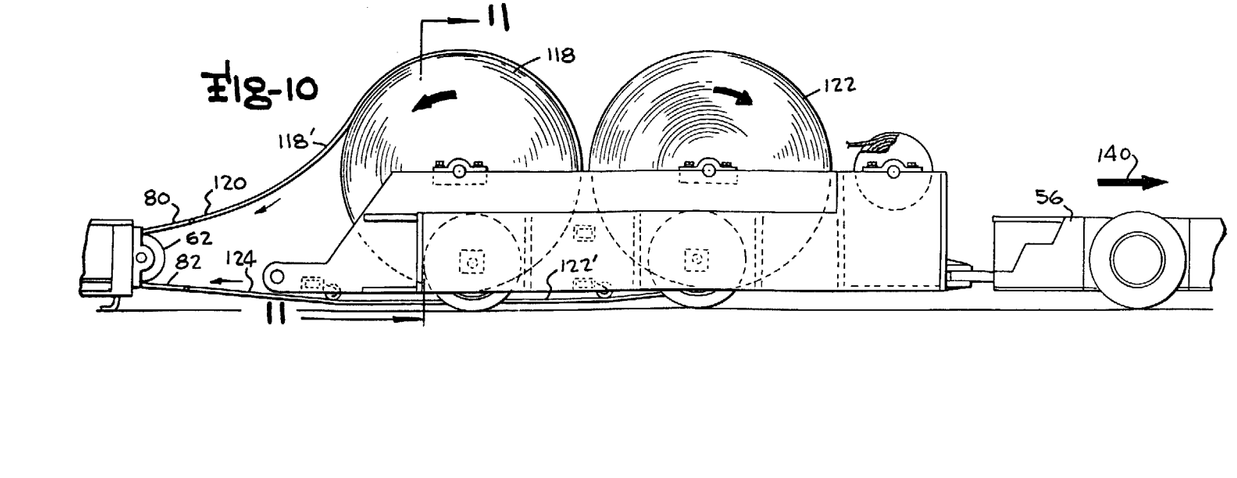
FIG. 10 is a side elevation view of a second embodiment of a carrier vehicle for practicing a second variation of the inventive method.
Figure 11:
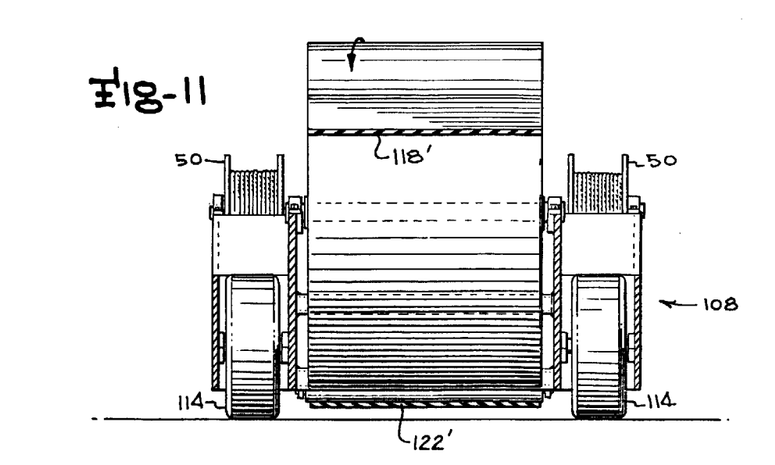
FIG. 11 is a sectional view taken along lines 11—11 of FIG. 10.

FIGS. 10 and 11 illustrate a second embodiment of the carrier vehicle which is different from the first embodiment in that it has the capacity for carrying drums having large diameter rolls 118 and 122 of new conveyor belting material. Rolls 118 and 122 comprise rolls of new belting material 118' and 122' respectively having ends 120 and 124 as received from the manufacturer and vehicle 108 consequently permits the use of such rolls without any intermediate unwinding as is the case with the first described embodiment. However, the vehicle 108 occupies substantially greater vertical height than does the first embodiment so that it is consequently incapable of usage in mines having low ceilings. In any event, the vehicle 108 includes supporting wheels 114 and wire cable reels 50 identical to the same cable reels used on the first embodiment. In use, the vehicle 108 is positioned adjacent and forward of the tailpiece roller 62 and the old belt ends 80 and 82 separated as shown in FIG. 3; the upper new belt end 120 is connected to the upper old belt end 80 while the lower new belt end 124 is connected to the lower old belt end 82. Since the rolls of new belting 118 and 122 are reversely mounted with respect to each other, forward movement of the vehicle 108 in the direction of arrow 140 in FIG. 10 permits an unwinding of the belting material in an obvious manner with the tailpiece 64 being concurrently towed to its new position. The new belting is then cut to provide trailing ends 130 and 132 (FIG. 12) which are connected together by a mechanical connector adjacent the tailpiece roller 62. Supports are provided for the supporting cable for new belt section and the belt loop is tensioned and following removal of the vehicle 108, the newly extended conveyor is ready to resume operation.

It should be understood that all embodiments of the invention will be subject to obvious modifications by those of skill in the art and the spirit and scope of the invention is consequently to be limited solely by the appended claims. For example, carrier vehicles 10 and 108 can be provided with flanged wheels capable of rail support if required. Additionally, both flange wheels and conventional wheels of the type illustrated can also be employed on the same vehicle with the flange wheels being supported for retraction during use of the conventional wheels in a well-known manner.

We claim:

1. A carrier vehicle for deploying new conveyor belting material for connection to an old conveyor belt for lengthening the old conveyor belt, said carrier vehicle comprising frame means, supporting wheels supporting said frame means for movement, at least one roll of new belting material rolled in a double thickness about the axis of a drum transverse to the carrier vehicle and having its middle point comprising a loop extending around winding rod means eccentric with respect to the axis of said reel and latch means normally holding said winding rod in position but permitting said winding rod to be removed from within said loop so as to permit said loop to clear said reel upon the unwinding of said roll of new belting material therefrom.

2. The invention of claim 1 additionally including end flanges on said drum means and a removable winding sleeve extending over said winding rod between said end flanges in a manner permitting rotation of said winding sleeve on said winding rod.

3. The invention of claim 2 wherein said end flanges include openings in which said winding rod is removably positioned.

4. The invention of claim 3 wherein said latch means comprises a latch plate removably mounted on one of said end flanges.

5. The invention of claim 4 additionally including wire rope cable deploying reel means permitting simultaneous deploying of a cable member along opposite side edges of the belting material being deployed from said carrier vehicle.

6. The invention of claim 1 additionally including wire rope cable deploying reel means permitting simultaneous deploying of a cable member along opposite side edges of the belting material being deployed from said carrier vehicle.

7. The invention of claim 6 additionally including end flanges on said drum means and a removable winding sleeve extending over said winding rod between said end flanges in a manner permitting rotation of said winding sleeve on said winding rod.

8. The invention of claim 7 wherein said end flanges include openings in which said winding rod is removably positioned.

* * * * *